(12) United States Patent
Masuda et al.

(10) Patent No.: US 11,907,048 B2
(45) Date of Patent: Feb. 20, 2024

(54) SCALING MEDIA UTILIZING HEALTHY REGIONS OF A TAPE CARTRIDGE

(71) Applicant: International Business Machines Corporation, Armonk, NY (US)

(72) Inventors: Setsuko Masuda, Toshima-ku (JP);
Tsuyoshi Miyamura, Yokohama (JP);
Mitsuhiro Nishida, Sagamihara (JP);
Tatsuki Sawada, Matsudo (JP)

(73) Assignee: International Business Machines Corporation, Armonk, NY (US)

( * ) Notice: Subject to any disclaimer, the term of this patent is extended or adjusted under 35 U.S.C. 154(b) by 217 days.

(21) Appl. No.: 17/540,697

(22) Filed: Dec. 2, 2021

(65) Prior Publication Data

US 2023/0176936 A1     Jun. 8, 2023

(51) Int. Cl.
*G06F 11/07*      (2006.01)
*G06F 3/06*       (2006.01)
*G11B 5/008*      (2006.01)
*G11B 20/18*      (2006.01)

(52) U.S. Cl.
CPC .......... *G06F 11/073* (2013.01); *G06F 3/0619* (2013.01); *G06F 3/0644* (2013.01); *G06F 3/0686* (2013.01); *G06F 11/0727* (2013.01); *G11B 20/18* (2013.01); *G06F 2201/805* (2013.01); *G11B 2020/183* (2013.01); *G11B 2220/655* (2013.01)

(58) Field of Classification Search
CPC .... G06F 11/073; G06F 3/0619; G06F 3/0644; G06F 3/0686; G06F 11/0727; G06F 2201/805; G06F 11/00; G11B 20/18; G11B 2020/183; G11B 2220/655
See application file for complete search history.

(56) References Cited

U.S. PATENT DOCUMENTS

| | | | |
|---|---|---|---|
| 9,934,816 B1 | 4/2018 | Miyamura | |
| 10,818,314 B1* | 10/2020 | Miyamura | ......... G11B 5/00813 |
| 2018/0090178 A1 | 3/2018 | Nylander-Hill | |
| 2020/0051592 A1 | 2/2020 | Yamamoto | |
| 2020/0357429 A1 | 11/2020 | Miyamura | |
| 2020/0401319 A1* | 12/2020 | Breuer | .................. G06F 3/0682 |
| 2021/0064249 A1* | 3/2021 | Mehta | ................. G06F 11/1048 |
| 2021/0109662 A1* | 4/2021 | Mendonsa | ............ G06F 3/0653 |

* cited by examiner

*Primary Examiner* — Andrew Sasinowski
(74) *Attorney, Agent, or Firm* — Andre Adkins

(57) ABSTRACT

A tool for scaling media utilizing healthy regions of a data storage cartridge. The tool determines a health status index for one or more regions of a data storage cartridge. The tool records the health status index to a cartridge memory and housekeeping dataset of the data storage cartridge. The tool determines one or more available regions of the data storage cartridge, based, at least in part, on a capacity designation and the health status index for the one or more regions. The tool returns the one or more available regions and a reduced capacity for the data storage cartridge to a user.

20 Claims, 9 Drawing Sheets

SCALING MEDIA UTILIZING HEALTHY REGIONS OF A TAPE CARTRIDGE

BACKGROUND OF THE INVENTION

The present invention relates generally to tape library storage management, and more particularly to performing scale media commands on a tape cartridge.

The growing volume of data, and the storage capacity to service information technology, has increased over the years. Other significant trends that affect planning storage strategies include scaling media on a tape cartridge.

Tape cartridges have traditionally been used for video archives, back-up files, replicas for disaster recovery, and retention of information on premise. Tape cartridges are commonly stored in enterprise tape libraries. In order to preserve these tape cartridges, high-density tape library frames containing high-density (HD) tape cartridge storage slots are utilized.

SUMMARY

Aspects of an embodiment of the present invention disclose a method, a computer program product, and a computer system for data storage library management Aspects of an embodiment of the present invention disclose a method for scaling media utilizing healthy regions of a data storage cartridge. The method includes determining, by one or more computer processors, a health status index for one or more regions of a data storage cartridge. The method further includes recording, by the one or more computer processors, the health status index to a cartridge memory and housekeeping dataset of the data storage cartridge. The method further includes determining, by the one or more computer processors, one or more available regions of the data storage cartridge, based, at least in part, on a capacity designation and the health status index for the one or more regions. The method further includes returning, by the one or more computer processors, the one or more available regions and a reduced capacity for the data storage cartridge to a user.

Aspects of an embodiment of the present invention disclose a computer program product for scaling media utilizing healthy regions of a data storage cartridge. The computer program product includes program instructions to determine a health status index for one or more regions of a data storage cartridge. The computer program product includes program instructions to record the health status index to a cartridge memory and housekeeping dataset of the data storage cartridge. The computer program product includes program instructions to determine one or more available regions of the data storage cartridge, based, at least in part, on a capacity designation and the health status index for the one or more regions. The computer program product includes program instructions to return the one or more available regions and a reduced capacity for the data storage cartridge to a user.

Aspects of an embodiment of the present invention disclose a computer system for scaling media utilizing healthy regions of a data storage cartridge. The computer system includes program instructions to determine a health status index for one or more regions of a data storage cartridge. The computer system includes program instructions to record the health status index to a cartridge memory and housekeeping dataset of the data storage cartridge. The computer system includes program instructions to determine one or more available regions of the data storage cartridge, based, at least in part, on a capacity designation and the health status index for the one or more regions. The computer system includes program instructions to return the one or more available regions and a reduced capacity for the data storage cartridge to a user.

DETAILED DESCRIPTION

Figure 1:
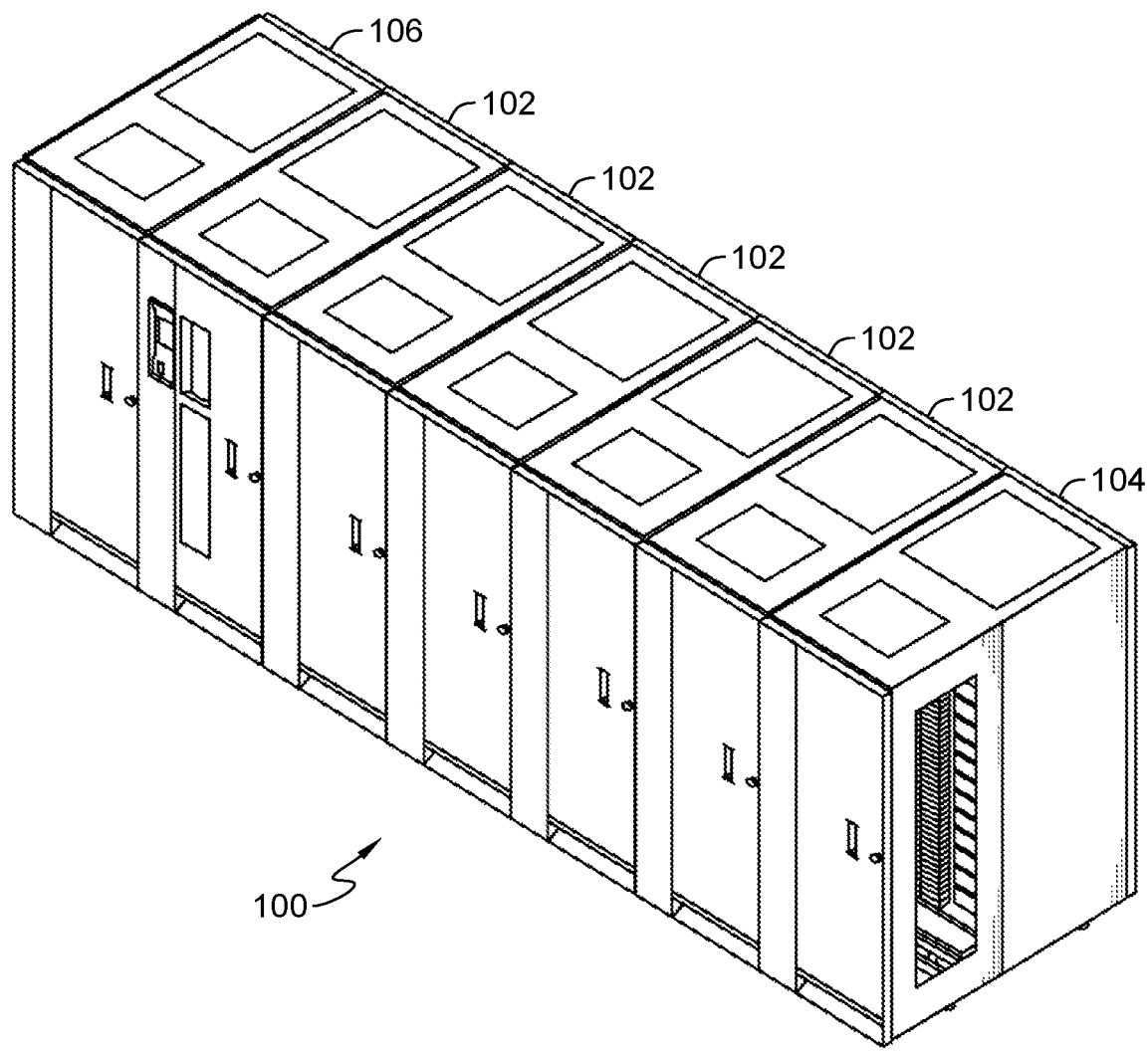
FIG. 1 illustrates a perspective view of a data storage library, in accordance with an embodiment of the present invention.

Embodiments of the present invention recognize that a tape drive read/write head reads and writes data on a tape medium of a tape cartridge while reciprocating in a longitudinal direction on a wrap of the tape medium with regions separated into longitudinal positions. Embodiments of the present invention recognize that the read/write head mainly reciprocates between logical points, and the tape medium heavily wears around the wrapping points in certain logical points where dust, such as peeled coating agent and dirt (debris), ends up easily accumulating. Embodiments of the present invention recognize that heavily used tape cartridges are prone to many read/write errors due to tape medium damage around certain logical points, especially the logical points surrounding an area around the beginning of user data regions, which is heavily used since the read/write head of the tape drive typically passes this when the tape cartridge is mounted into the tape drive.

Embodiments of the present invention recognize that in a tape cartridge worn as described above, it can be observed that there is an increase in an error rate in a region around certain logical points in a tape map. Embodiments of the present invention recognize that tape map information is saved only in a main memory of the tape drive and is lost when the tape drive is turned off, or the tape cartridge is ejected from the tape drive. Embodiments of the present invention recognize that the amount of data in the tape map is often too large to be saved in a non-volatile memory, such as a cartridge memory (CM) mounted on the tape cartridge, which has a small storage capacity. Embodiments of the present invention recognize that since data for saving storage management information, called housekeeping dataset (HKDS), can be written to the tape cartridge, it is also possible to save data there. Embodiments of the present invention recognize that HKDS cannot be written or read to unhealthy regions of the tape media cartridge and as such data saving is not always guaranteed.

Embodiments of the present invention recognize that, regarding a tape capacity of a tape cartridge, a user designates a percentage of the tape capacity to be used for performing scale media operations. Embodiments of the present invention recognize that with current scale media commands, the user only designates the capacity ratio, and cannot choose which region of the tape medium to use as a user region. Embodiments of the present invention recognize that when the tape capacity is reduced during scale media operations, a phenomenon occurs in which a region in good condition (e.g., not worn) is disabled, and a worn region is continuously used.

Embodiments of the present invention provide the capability to, during use of the tape cartridge, calculate a health status of each region of the tape medium from an error rate of reading and writing from the tape map, and record the health status in a cartridge memory and housekeeping dataset for the tape cartridge. Embodiments of the present invention provide the capability to, upon receipt of a scale media request, select a user region so that any region in poor condition can be excluded. Embodiments of the present invention provide the capability to refer to health statuses recorded in the cartridge memory and select one or more regions that are determined to be healthy for reading and writing operations. Embodiments of the present provide the capability to return the resulting one or more regions and available tape capacity to a user.

Implementation of such embodiments may take a variety of forms, and implementation details are discussed subsequently with reference to the Figures.

Referring now to various embodiments of the invention in more detail, FIG. 1 is a perspective view illustrating a data storage library suitable for providing tape library data protection, in accordance with at least one embodiment of the invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, a computer-implemented method includes identifying a lower calibration target of a column of an automated tape library and identifying an upper calibration target of the column. The method includes calculating at least one slot position between the upper calibration target and the lower calibration target. For at least some of the calculated slot positions, the method includes performing a check including identifying an actual slot position corresponding to the calculated slot position. The actual slot position is located by a robotic accessor. The method includes comparing the calculated slot position to the corresponding identified actual slot position and determining whether the calculated slot position is within a predefined range of the corresponding identified actual slot position. The method includes outputting a result of the determination.

In another general embodiment, a system includes a processor and logic integrated with the processor, executable by the processor, or integrated with and executable by the processor. The logic is configured to perform the foregoing method.

In another general embodiment, a computer program product includes one or more computer readable storage media, and program instructions collectively stored on the one or more computer readable storage media. The program instructions include program instructions to perform the foregoing method.

Figure 2:
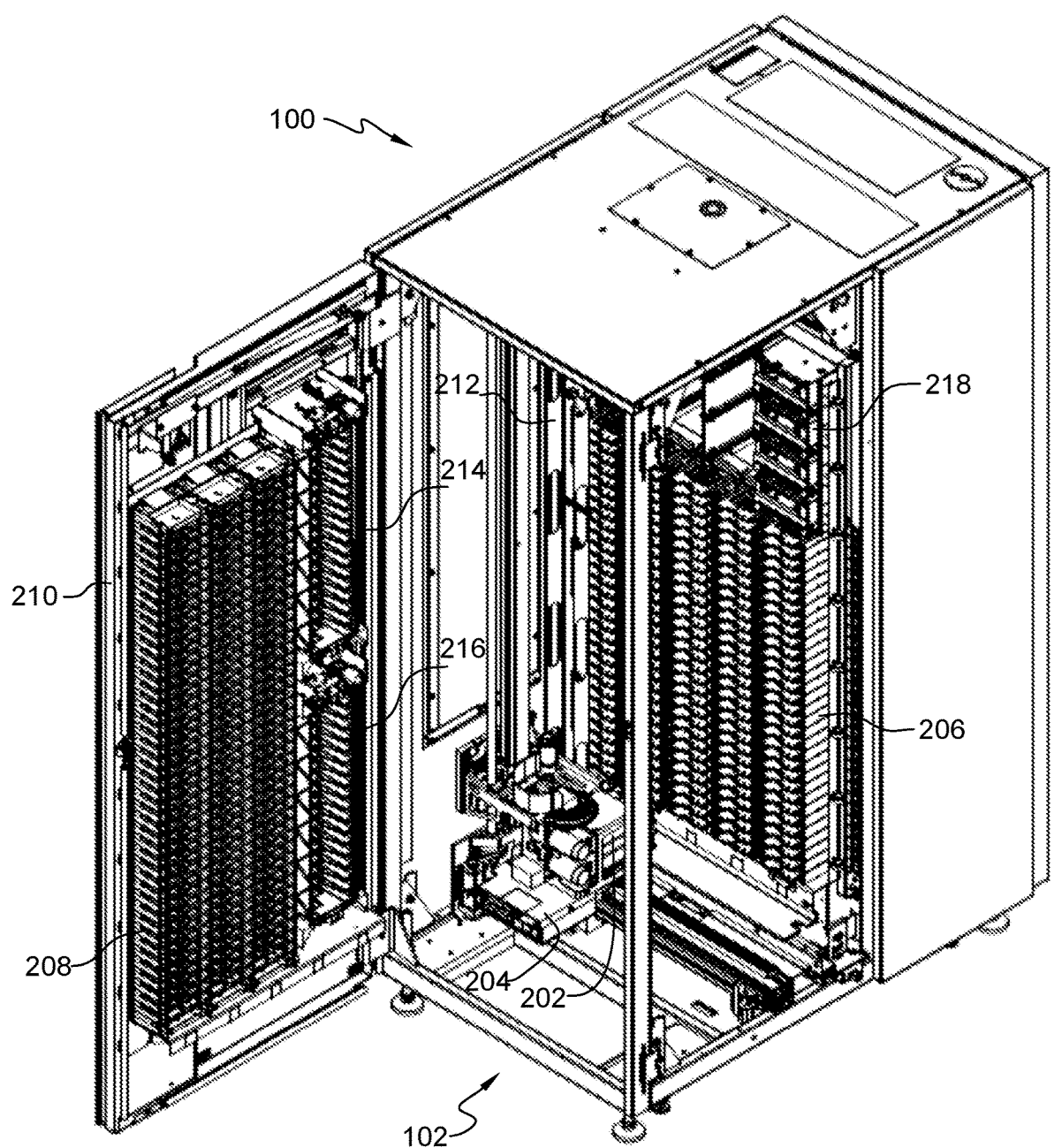
FIG. 2 illustrates a perspective view of a data storage frame from the data storage library of FIG. 1, in accordance with an embodiment of the present invention.
Figure 5:
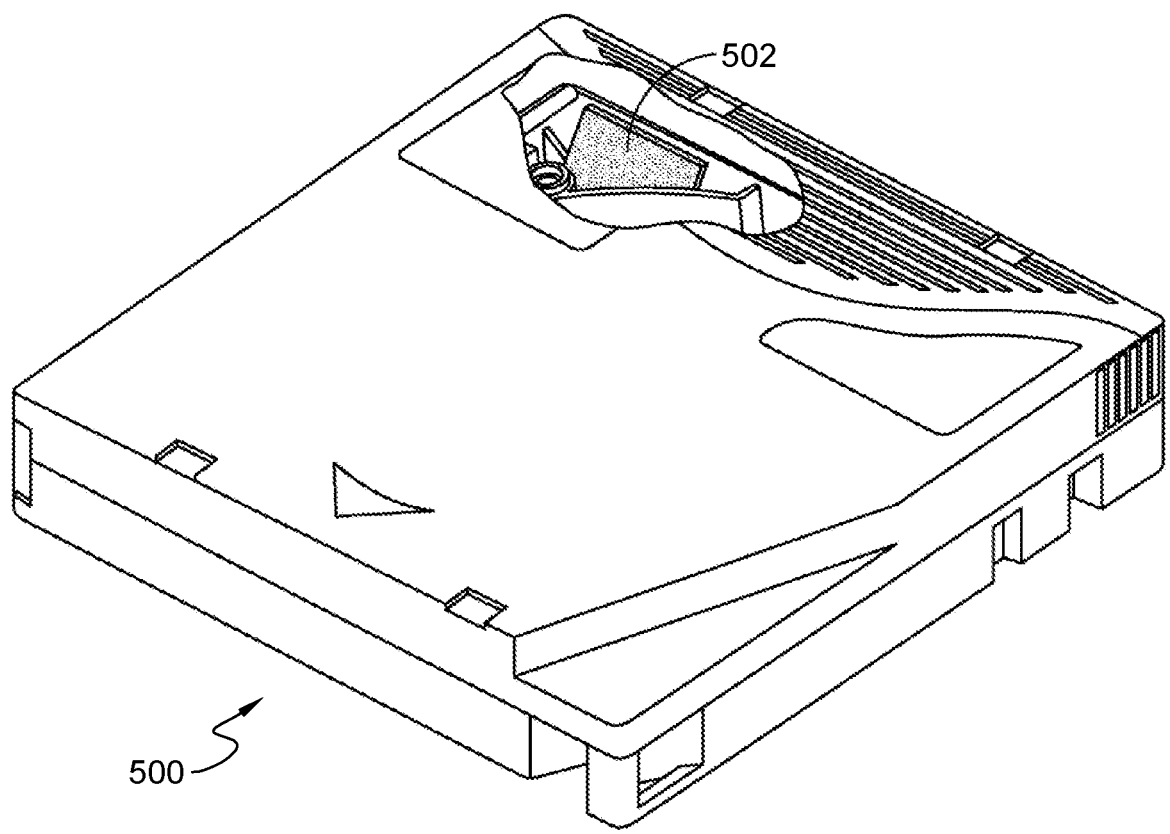
FIG. 5 illustrates a perspective view of a data storage cartridge from the data storage library of FIG. 1, in accordance with an embodiment of the present invention.

FIGS. 1 and 2 illustrate a data storage library 100 which stores and retrieves data storage cartridges, such as data storage cartridges 500 of FIG. 5, containing data storage media (not shown), from multi-cartridge deep slot cells 206 and single cartridge storage slots 208. An example of an automated data storage library which has a similar configuration as that depicted in FIGS. 1 and 2, and may be implemented with some of the various approaches herein is the IBM® 3584 UltraScalable Tape Library (IBM and all IBM—based trademarks and logos are trademarks or registered trademarks of International Business Machines Corporation and/or its affiliates). Moreover, it should be noted that references to "data storage media" herein refer to data storage cartridges, and for purposes of the present application, the two terms may be used synonymously.

Data storage library 100 of FIG. 1 comprises a left-hand service bay 106, one or more data storage frames 102, and right-hand service bay 104. As will be discussed in further detail below, a frame may comprise an expansion component of the library. Thus, storage frames may be added or removed to expand or reduce the size and/or functionality of the library. According to different approaches, frames may include additional storage slots, deep slot cells, drives, import/export stations, accessors, operator panels, etc.

FIG. 2 shows an embodiment of a data storage frame 102, which acts as the base frame of data storage library 100. Moreover, data storage frame 102 illustrated in FIG. 2 is contemplated to be a minimum configuration of data storage library 100, for which there is only a single accessor, such as single accessor 204 (i.e., there are no redundant accessors) and no service bay. However, in other embodiments, a storage frame may include multiple robotic accessors and/or service bays.

Looking to FIG. 2, data storage library 100 is arranged for accessing data storage media in response to commands from at least one external host system (not shown). Data storage library 100 includes a plurality of storage slots, such as single cartridge storage slots 208 on front wall 210 and a plurality of multi-cartridge deep slot cells, such as multi-cartridge deep slot cells 206 on rear wall 212, both of which may be used for storing data storage cartridges that may contain data storage media. According to one approach, the single cartridge storage slots 208 are configured to store a single data storage cartridge, and multi-cartridge deep slot cells 206 are configured to store a plurality of data storage cartridges. In a preferred approach, the multi-cartridge deep slot cells may be arranged in sequential order of tiers from front to rear (e.g., see FIG. 6A and FIG. 7).

With continued reference to FIG. 2, data storage frame 102 of data storage library 100 also includes at least one data storage drive, such as data storage drive 218, e.g., for reading and/or writing data with respect to the data storage media. Additionally, single accessor 204 may be used to transport data storage media between single cartridge storage slots 208, multi-cartridge deep slot cells 206, and/or data storage drive 218. According to various approaches, data storage drive 218 may be optical disc drives, magnetic tape drives, solid state drives having nonvolatile random-access memory (NVRAM) such as Flash memory, or other types of data storage drives as are used to read and/or write data with respect to the data storage media.

As illustrated, the data storage frame 102 may optionally include an operator panel or other user interface, such as a web-based interface, which allows a user to interact with the data storage library 100. The data storage frame 102 may also optionally comprise upper I/O station 214 and/or lower I/O station 216, thereby allowing data storage cartridges to be added (e.g., inserted) to the library inventory and/or removed from the library without disrupting library operation. Furthermore, data storage library 100 may have one or more data storage frames, such as data storage frames 102, each having single cartridge storage slots 208, multi-cartridge deep slot cells 206, and/or data storage drive 218, preferably accessible by single accessor 204.

As described above, data storage frame 102 may be configured with different components depending upon the intended function. One configuration of data storage frame 102 may comprise single cartridge storage slots 208, multi-cartridge deep slot cells 206, and/or data storage drive 218, and other optional components to store and retrieve data from the data storage cartridges. However, in another approach, data storage frame 102 may include single cartridge storage slots 208, multi-cartridge deep slot cells 206 and no other components. The single accessor 204 may have gripper assembly 202, e.g., for gripping one or more data storage media, in addition to having a bar code scanner or other reading system, such as a cartridge memory reader or similar system mounted on gripper assembly 202, to "read" identifying information about the data storage media.

FIG. 2 depicts an automated data storage library 100, in accordance with one embodiment. As an option, the present automated data storage library 100 may be implemented in conjunction with features from any other embodiment listed herein, such as those described with reference to the other FIGS. Of course, however, such automated data storage library 100 and others presented herein may be used in various applications and/or in permutations which may or may not be specifically described in the illustrative embodiments listed herein. Further, the automated data storage library 100 presented herein may be used in any desired environment. Thus FIG. 2 (and the other FIGS.) should be deemed to include any and all possible permutations.

Data storage library 100 as described in reference to FIGS. 1 and 2, is depicted according to one embodiment. According to the depicted embodiment, the data storage library 100 may employ a controller, e.g., arranged as a distributed system of modules with a plurality of processor nodes.

In one approach, the library is controlled, not by a central controller, but rather, by a distributed control system for receiving logical commands and converting the commands to physical movements of the accessor and gripper, and for operating the drives in accordance with the desired physical movements. The distributed control system may also provide logistical support, such as responding to host requests for element status, inventory, library status, etc. The specific commands, the conversion of those commands to physical movements, and the operation of the drives may be of a type known to those of skill in the art.

While data storage library 100 has been described as employing a distributed control system, various other approaches described and/or suggested herein may be implemented in automated data storage libraries regardless of control configuration, such as, but not limited to, an automated data storage library having one or more library controllers that are not distributed.

Data storage library 100 may have one or more data storage frames 102, left hand service bay 106 and right hand service bay 104. The left-hand service bay 106 may include a first accessor, where, as discussed above, single accessor 204 may include gripper assembly 202 and/or a bar code scanner (e.g., reading system) to "read" identifying information about the data storage media depending on the desired embodiment. Furthermore, right-hand service bay 104 may include a second accessor, which includes a second gripper assembly, and may also include a reading system to "read" identifying information about the data storage media (not shown).

According to one embodiment, in the event of a failure or other unavailability of the single accessor 204, or gripper assembly 202, etc., the second accessor may perform some or all the functions of single accessor 204. Thus, in different approaches, the two accessors may share one or more mechanical paths, they may have completely independent mechanical paths, or combinations thereof. In one example, the accessors may have a common horizontal rail with independent vertical rails to travel there along. Moreover, it should be noted that the accessors are described as first and second for descriptive purposes only and this description is not meant to limit either accessor to an association with either left-hand service bay 106, or right-hand service bay 104.

In an embodiment which is in no way intended to limit the invention, the first and second accessors may preferably move their grippers in at least two directions, called the horizontal "X" direction and vertical "Y" direction, e.g., to retrieve and grip, deliver and release, load and unload, etc. the data storage cartridge at single cartridge storage slots 208, multi-cartridge deep slot cells 206, data storage drive 218, etc.

Data storage library 100 receives commands from one or more host systems (not shown). The host systems, such as host servers, communicate with data storage library 100 directly, e.g., on a path, through one or more control ports (not shown), or through one or more data storage drive 218 on paths. Thus, in different approaches, the host systems may provide commands to access particular data storage cartridges and move the cartridges, for example, between single cartridge storage slots 208 and data storage drive 218. The commands are typically logical commands identifying the cartridges or cartridge media, and/or logical locations for accessing the media. Furthermore, it should be noted that the terms "commands" and "work requests" are used interchangeably herein to refer to such communications from the host system to data storage library 100 as are intended to result in accessing particular data storage media within data storage library 100 depending on the desired approach.

According to one embodiment, data storage library 100 may be controlled by a library controller. Moreover, in various approaches, the library controller may include a distributed control system receiving the logical commands from hosts, determining the required actions, and/or converting the actions to physical movements of the first and/or second accessor. In another approach, the distributed control system may have a plurality of processor nodes, each having one or more computer processors. According to one example of a distributed control system, a communication processor node may be located in data storage frame 102. The communication processor node provides a communication link for receiving the host commands, either directly or through the data storage drive 218, via at least one external interface, e.g., coupled to a line.

In one embodiment, a communication processor node may additionally provide a communication link for communicating with data storage drive 218. The communication processor node may preferably be located in data storage frame 102, e.g., close to data storage drive 218. Furthermore, one or more additional work processor nodes may be provided to form a distributed processor system, which may comprise, e.g., a work processor node located at first accessor, and that is coupled to the communication processor node via a network. According to different approaches, each work processor node may respond to received commands that are broadcast thereto from any communication processor node, and the work processor nodes may also direct the operation of the accessors, e.g., providing move commands. An XY processor node may be provided and may be located at an XY system of a first accessor. As illustrated, the XY processor node is coupled to the network, and is responsive to the move commands, operating the XY system to position gripper assembly 202.

Also, an operator panel processor node may be provided at an optional operator panel for providing an interface for communicating between the operator panel and the communication processor node, the work processor nodes, and the XY processor nodes.

A network, for example comprising a common bus, is provided, coupling the various processor nodes. The network may comprise a robust wiring network, such as the commercially available Controller Area Network (CAN) bus system, which is a multi-drop network, having a standard access protocol and wiring standards, for example, as defined by CiA®, the CAN in Automation Association, Am Weich Selgarten 26, D-91058 Erlangen, Germany. Other networks, such as Ethernet, or a wireless network system, such as RF or infrared, may be employed in the library as is known to those of skill in the art. In addition, multiple independent networks may also be used to couple the various processor nodes.

The communication processor node may be coupled to data storage drive 218 of data storage frame 102, via lines, and are thereby communicating with data storage drive 218 and with one or more host systems. Alternatively, the host systems may be directly coupled to the communication processor node, at an input for example, or to control port devices (not shown) which connect the library to the host system(s) with a library interface similar to the drive/library interface. As is known to those of skill in the art, various communication arrangements may be employed for communication with the hosts and with the data storage drives. In one example, host connections are intended to be Ethernet and a SCSI bus, respectively, e.g., and may serve as host connections. However, a bus may comprise an example of a Fibre Channel bus which is a high speed serial data interface, allowing transmission over greater distances than the SCSI bus systems.

According to some approaches, data storage drive 218 may be in close proximity to the communication processor node, and may employ a short distance communication scheme, such as Ethernet, or a serial connection, such as RS-422. Thus, data storage drive 218 may be individually coupled to the communication processor node by one or more lines. Alternatively, data storage drive 218 may be coupled to the communication processor node through one or more networks.

Furthermore, additional storage frames, such as data storage frame 102 may be provided, whereby each is preferably coupled to the adjacent storage frame. According to various approaches, any of the additional storage frames 102 may include communication processor nodes, single cartridge storage slots 208, data storage drive 218, multi-cartridge deep slot cells 206, and one or more networks, etc.

Moreover, as described above, data storage library 100 may comprise a plurality of accessors. A second accessor, for example, may be located in right-hand service bay 104 of FIG. 1. The second accessor may include a gripper assembly, such as gripper assembly 202, for accessing the data storage media, and an XY system for moving the second accessor. The second accessor may run on the same horizontal mechanical path as a first accessor, and/or on an adjacent (e.g., separate) path. Moreover a control system may additionally include an extension network, which forms an additional network coupled to a network of data storage frame 102 and to a network of left-hand service bay 106.

In one embodiment, the first and second accessors are associated with left-hand service bay 106 and right-hand service bay 104 respectively. However, this is for illustrative purposes and there may not be an actual association. Thus, according to another approach, a network may not be associated with left-hand service bay 106, and the network may not be associated with right-hand service bay 104. Moreover, depending on the design of data storage library 100, it may not be necessary to have left-hand service bay 106 and/or right-hand service bay 104 at all.

Data storage library 100 typically comprises one or more controllers to direct the operation of the automated data storage library. Moreover, host computers and data storage drives typically include similar controllers. A library controller may take many different forms and may comprise, for example, but is not limited to, an embedded system, a distributed control system, a personal computer, a workstation, etc. The term "library controller" as used herein is intended in its broadest sense as a device that includes at least one processor, and optionally further circuitry and/or logic, for controlling and/or providing at least some aspects of library operations.

Figure 3:
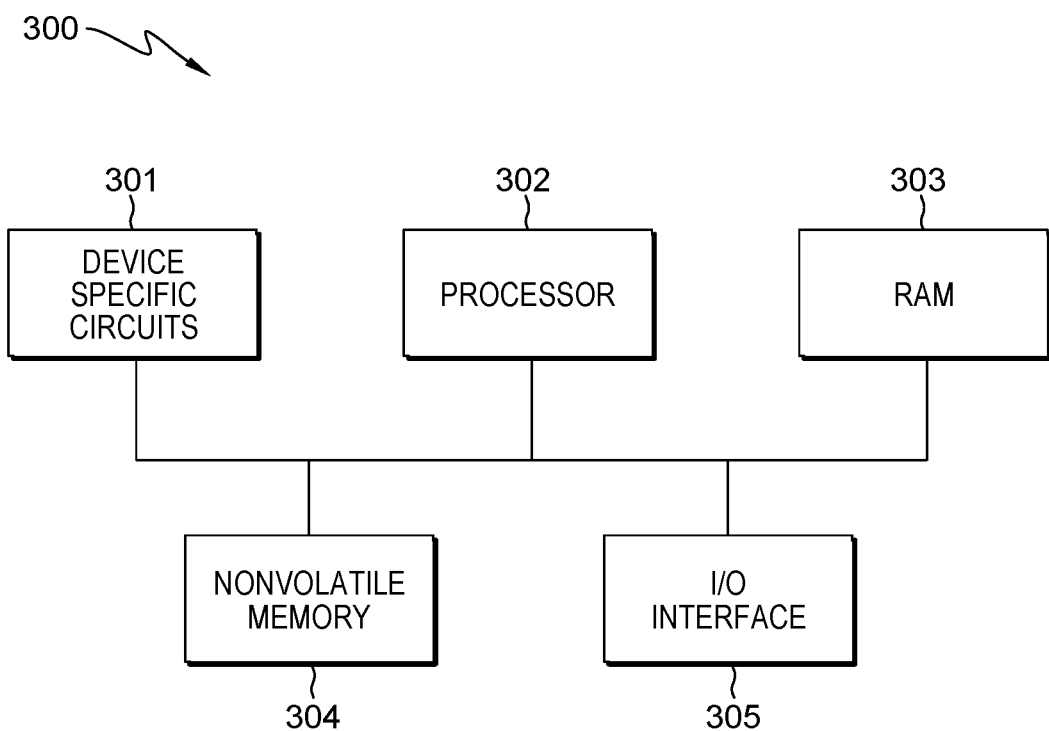
FIG. 3 illustrates a block diagram depicting a controller configuration for the data storage library of FIG. 1, in accordance with an embodiment of the present invention.

Referring now to FIG. 3, a typical controller 300 is shown with a processor 302, Random Access Memory (RAM) 303, nonvolatile memory 304, device specific circuits 301, and I/O interface 305. Alternatively, the RAM 303 and/or nonvolatile memory 304 may be contained in the processor 302 as could the device specific circuits 301 and I/O interface 305. The processor 302 may comprise, for example, an off-the-shelf microprocessor, custom processor, Field Programmable Gate Array (FPGA), Application Specific Integrated Circuit (ASIC), discrete logic, etc. The RAM 303 is typically used to hold variable data, stack data, executable instructions, etc.

According to various approaches, the nonvolatile memory 304 may comprise any type of nonvolatile memory such as, but not limited to, Electrically Erasable Programmable Read Only Memory (EEPROM), flash Programmable Read Only Memory (PROM), battery backup RAM, hard disk drives, etc. However, the nonvolatile memory 304 is typically used to hold the executable firmware and any nonvolatile data. Moreover, the I/O interface 305 comprises a communication interface that allows the processor 302 to communicate with devices external to the controller. Examples may comprise, but are not limited to, serial interfaces such as RS-232, USB (Universal Serial Bus) or Small Computer Systems Interface (SCSI). The device specific circuits 301 provide additional hardware to enable the controller 300 to perform unique functions including, but not limited to, motor control of a cartridge gripper. Moreover, the device specific circuits 301 may include electronics that provide, by way of example but not limitation, Pulse Width Modulation (PWM) control, Analog to Digital Conversion (ADC), Digital to Analog Conversion (DAC), etc. In addition, all or part of the device specific circuits 301 may reside outside the controller 300.

While data storage library 100 is described as employing a distributed control system, the various approaches described and/or suggested herein may be implemented in various automated data storage libraries regardless of control configuration, including, but not limited to, an automated data storage library having one or more library controllers that are not distributed. Moreover, a library controller may comprise one or more dedicated controllers of a library, depending on the desired embodiment. For example, there may be a primary controller and a backup controller. In addition, a library controller may comprise one or more processor nodes of a distributed control system. According to one example, a communication processor node may comprise the library controller while the other processor nodes (if present) may assist the library controller and/or may provide backup or redundant functionality. In another example, communication processor node and work processor node may work cooperatively to form the library controller while the other processor nodes (if present) may assist the library controller and/or may provide backup or redundant functionality. Still further, all of the processor nodes may comprise the library controller. According to various approaches described and/or suggested herein, a library controller may have a single processor or controller, or it may include multiple processors or controllers.

Figure 4A:
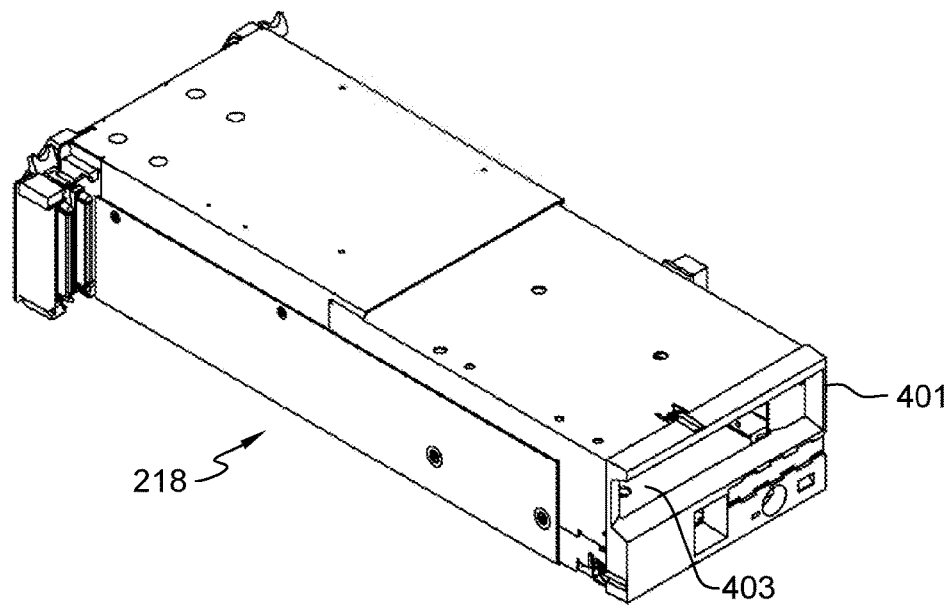
FIG. 4A illustrates a front perspective view of a data storage drive from the data storage library of FIG. 1, in accordance with an embodiment of the present invention.
Figure 4B:
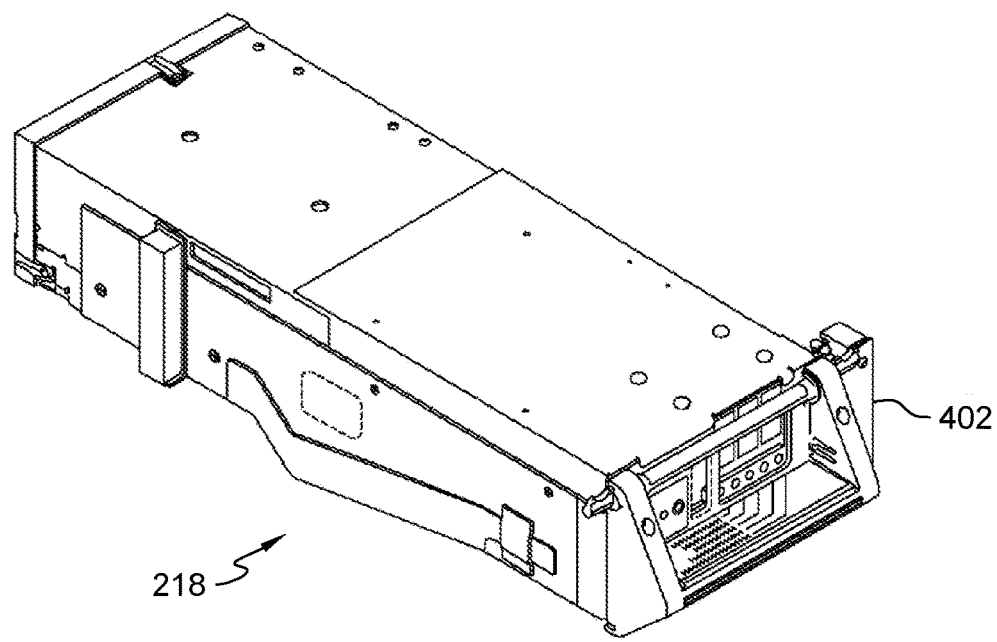
FIG. 4B illustrates a rear perspective view of the data storage drive of FIG. 4A, in accordance with an embodiment of the present invention.

FIGS. 4A and 4B illustrate the front 401 and rear 402 views of data storage drive 218, according to one embodiment. In the example depicted in FIGS. 4A and 4B, data storage drive 218 comprises a hot-swap drive canister, which is in no way intended to limit the invention. In fact, any configuration of data storage drive may be used whether or not it includes a hot-swap canister. As discussed above, data storage drive 218 is used to read and/or write data with respect to the data storage media, and may additionally communicate with a memory which is separate from the media, and is located within the cartridge. Thus, according to one approach, a data storage cartridge may be placed into data storage drive 218 at opening 403.

Furthermore, FIG. 5 illustrates an embodiment of a data storage cartridge, such as data storage cartridge 500, with a cartridge memory (CM), such as cartridge memory 502, shown in a cutaway portion of FIG. 5, which is in no way intended to limit the invention. In fact, any configuration of data storage cartridge may be used whether or not it comprises a cartridge memory. According to various approaches, media of the data storage cartridge media may include any type of media on which data may be stored, including but not limited to magnetic media, e.g., magnetic tape, disks, etc.; optical media, e.g., optical tape, discs, etc.; electronic media, e.g., PROM, EEPROM, flash PROM, CompactFlash™, Smartmedia™, Memory Stick®, etc.; etc., or other suitable media. Moreover, an example of a data storage cartridge that is widely employed in automated data storage libraries for mass data storage is a magnetic tape cartridge in which the media is magnetic tape.

Figure 6A:
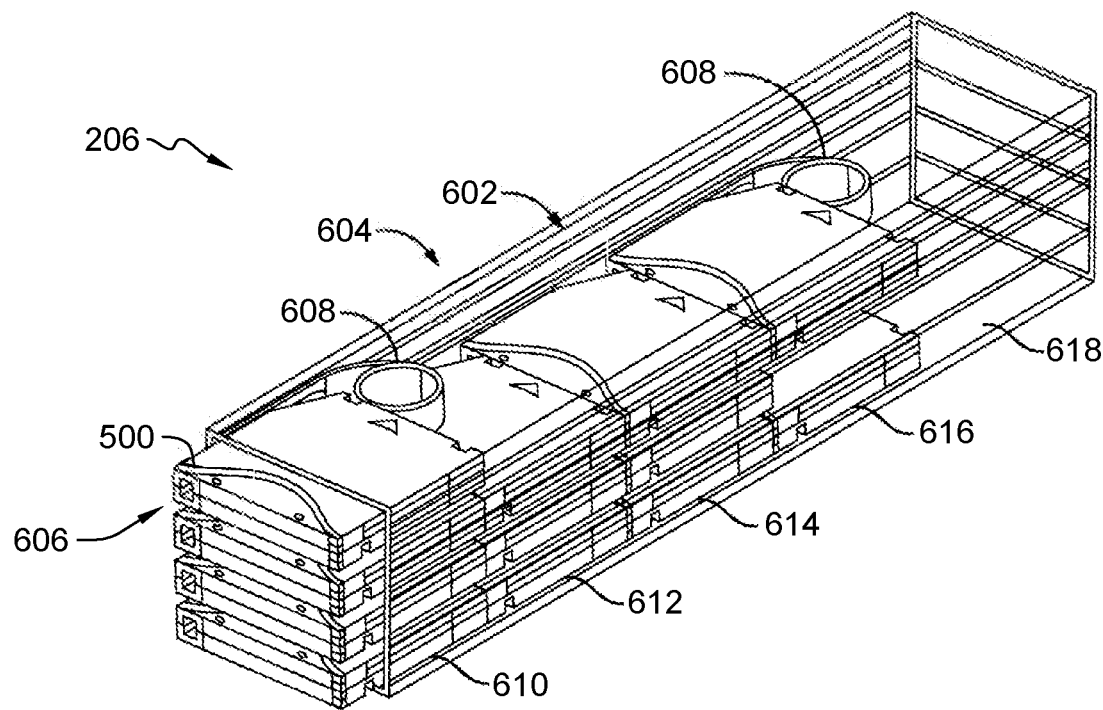
FIGS. 6A and 6B illustrate perspective views of a multi-cartridge deep slot cell from the data storage library of FIG. 1, in accordance with an embodiment of the present invention.
Figure 6B:
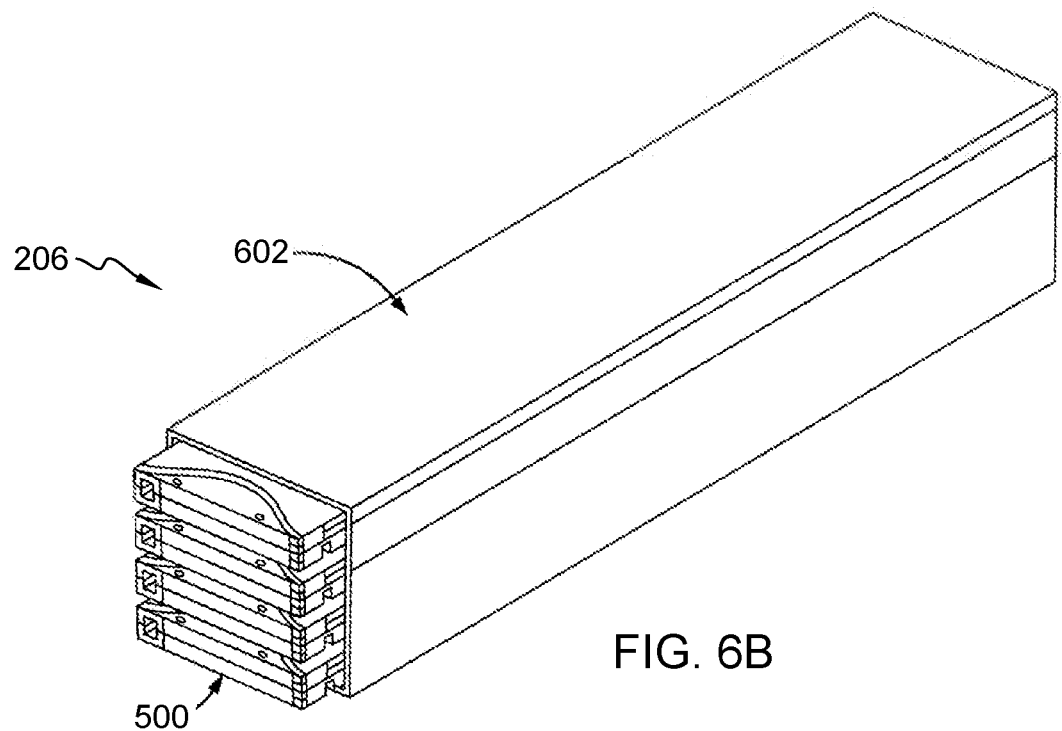

FIGS. 6A and 6B illustrate multi-cartridge deep slot cell 206 having biasing springs 608, as depicted according to one embodiment. As shown in the illustrative embodiment, multi-cartridge deep slot cell 206 comprises housing 602 defining an interior space 606. Furthermore, a plurality of storage slots 604 is disposed within the housing and may be configured for storing up to a plurality of data storage cartridges 500, depending on the desired approach. Alternatively, multi-cartridge deep slot cell 206 may be built into the frame of the automated data storage library according to one approach.

Referring to FIGS. 6A and 6B, in accordance with one embodiment, storage slots 604 are depicted as being configured for storing up to a plurality of data storage cartridges 500, and arranged in sequential order of tier 610, tier 612, tier 614, tier 616, and tier 618 from front to rear. It should be noted that the frontmost tier, tier 610, is also called "tier 1", while the next tier 612 is called "tier 2", etc., and the last tier 618 is also called "tier 5", or the "rearmost" tier. However, referring to FIG. 2, in one embodiment, single cartridge storage slots 208 are also termed "tier 0". In one embodiment, multi-cartridge deep slot cell 206 is a high-density storage slot within a tape library frame, such as data storage frame 102, capable of storing up to five tape cartridges (5×), such as data storage cartridge 500, stacked in a row within a single slot space within the tape library frame. For example, multi-cartridge deep slot cell 206 is a high density storage slot capable of storing up to five tape cartridges in a tiered orientation, with a tier 5 position on linear tape open (LTO) tape cartridges being a first tape cartridge loaded into the slot (rear-most tape cartridge on a depth side of a tape library frame), and a tier 1 position being a last tape cartridge loaded into the slot (forward-most tape cartridge on a front side of a tape library frame). Where a tier 5 position LTO tape cartridge is requested, the LTO tape cartridges forward of it (up to four cartridges), need to be removed in order to access the requested LTO tape cartridge. In alternative embodiments, multi-cartridge deep slot cell 206 is capable of storing up to four tape cartridges in a tiered orientation, with a tier 4 position on enterprise tape cartridges being a first tape cartridge loaded into the slot (rear-most tape cartridge), and a tier 1 position being a last tape cartridge loaded into the slot (forward-most tape cartridge). Where a tier 4 position enterprise tape cartridge is requested, the enterprise tape cartridges forward of it (up to three cartridges), need to be removed in order to access the requested enterprise tape cartridge. However, it should be appreciated that embodiments of the present invention may be practiced with tape library frames having any number of tiered positions within a storage slot.

In one embodiment, multi-cartridge deep slot cell 206 may include a cartridge blocking mechanism having a retaining gate that retains the data storage cartridges, such as data storage cartridge 500, in multi-cartridge deep slot cell 206 according to one embodiment. According to one approach, the retaining gate may be externally attached to multi-cartridge deep slot cell 206, relative to a front opening of multi-cartridge deep slot cell 206, whereby the retaining gate can be activated by an accessor, e.g., of data storage library 100. Moreover, the retaining gate allows for positive cartridge retention against the pressure of biasing springs 608 (see FIGS. 6A and 6B) and ensures that one or more data storage cartridges do not get pushed out of multi-cartridge deep slot cell 206 simultaneously, while allowing a pushing mechanism (not shown) of multi-cartridge deep slot cell 206 to continuously push data storage cartridge(s) to the opening in multi-cartridge deep slot cell 206. Thus, according to one approach, the accessor may open the retaining gate to gain access to the data storage cartridge in tier 1 and, upon its extraction, the biasing spring 608 moves the cartridge(s) positioned behind the extracted cartridge forward, thereby promoting the cartridge(s) by one tier as will soon become apparent.

The basic working of the retaining gate is that the gate prevents the data storage cartridge(s) from being pushed out of multi-cartridge deep slot cell 206. For example, a retaining gate can be lifted by, for example, a gripper assembly, such as gripper assembly 202, or by a front storage cartridge for cartridge removal from/insertion into multi-cartridge deep slot cell 206. Specifically, retaining gate has a pivoting arm mounted on multi-cartridge deep slot cell 206 via a pivoting post that can be integral to a construction of multi-cartridge deep slot cell 206. The pivoting arm is located below a catch of retaining gate whereby a thrust force through data storage cartridge 500 caused by the pushing mechanism of multi-cartridge deep slot cell 206 causes the retaining gate to stay closed in a retaining position. Moreover, the retaining gate is preferably biased such that it closes in the downward direction over the front opening of multi-cartridge deep slot cell 206. This constant biasing may be achieved via gravity, or by implementing a spring force, e.g., attached to the retaining gate.

For removal of a front storage cartridge by a gripper assembly, such as gripper assembly 202, from multi-cartridge deep slot cell 206, the retaining gate must be lifted upward to a releasing position whereby a catch of the retaining gate is disengaged from the front storage cartridge. Once the retaining gate is lifted to the releasing position and the accessor is engaged with a data storage cartridge, such as data storage cartridge 500, the accessor can pull the storage cartridge out of multi-cartridge deep slot cell 206 and into a gripper assembly, such as gripper assembly 202, of the accessor without any interference of the retaining gate.

Once the front storage cartridge is extracted and subsequent data storage cartridges are retained from being pushed out of multi-cartridge deep slot cell 206, the retaining gate has successfully completed its cartridge retrieval process. When a gripper assembly, such as gripper assembly 202, begins to insert storage cartridge back into multi-cartridge deep slot cell 206, the retaining gate is lifted to its releasing position to allow storage cartridges through the front opening of multi-cartridge deep slot cell 206. A catch of the retaining gate interfaces with a rear portion of the storage cartridge, in particular a beveled surface of the catch, whereby the retaining gate is lifted to its releasing position due to the storage cartridge being pushed into multi-cartridge deep slot cell 206 by the gripper assembly, such as gripper assembly 202. In doing so, data storage cartridges are pushed deeper into multi-cartridge deep slot cell 206 by the first storage cartridge in multi-cartridge deep slot cell 206 by the gripper assembly, such as gripper assembly 202. Thus, gripper assembly 202 can provide a force greater than the thrust force antiparallel thereto, to overcome the directional biasing of the storage cartridges. Upon full insertion into multi-cartridge deep slot cell 206, the retaining gate moves to its retaining position to engage the storage cartridge.

Thus, looking to various embodiments presented herein, access to a storage slot may include the ability to remove a cartridge from a storage slot, the ability to place a cartridge into a storage slot, or combinations thereof.

According to an embodiment, the storage slots from top to bottom are considered to be in parallel and comprise the same tier. Moreover, the storage slots from front to back, in a particular row, are considered to be in series and comprise sequential tiers.

In one embodiment, one or more data storage cartridges may be added into data storage library 100, e.g., at an I/O station, whereby the controller of data storage library 100 may then operate single accessor 204 to transport the data storage cartridge(s) to a specific multi-cartridge deep slot cell 206 and place the data storage cartridge(s) therein. Similarly, the controller may operate single accessor 204 to selectively extract, place and transport data storage cartridges with respect to single cartridge storage slots 208, and/or transport inserted or added cartridge(s) to specific single cartridge storage slots 208.

Figure 7:
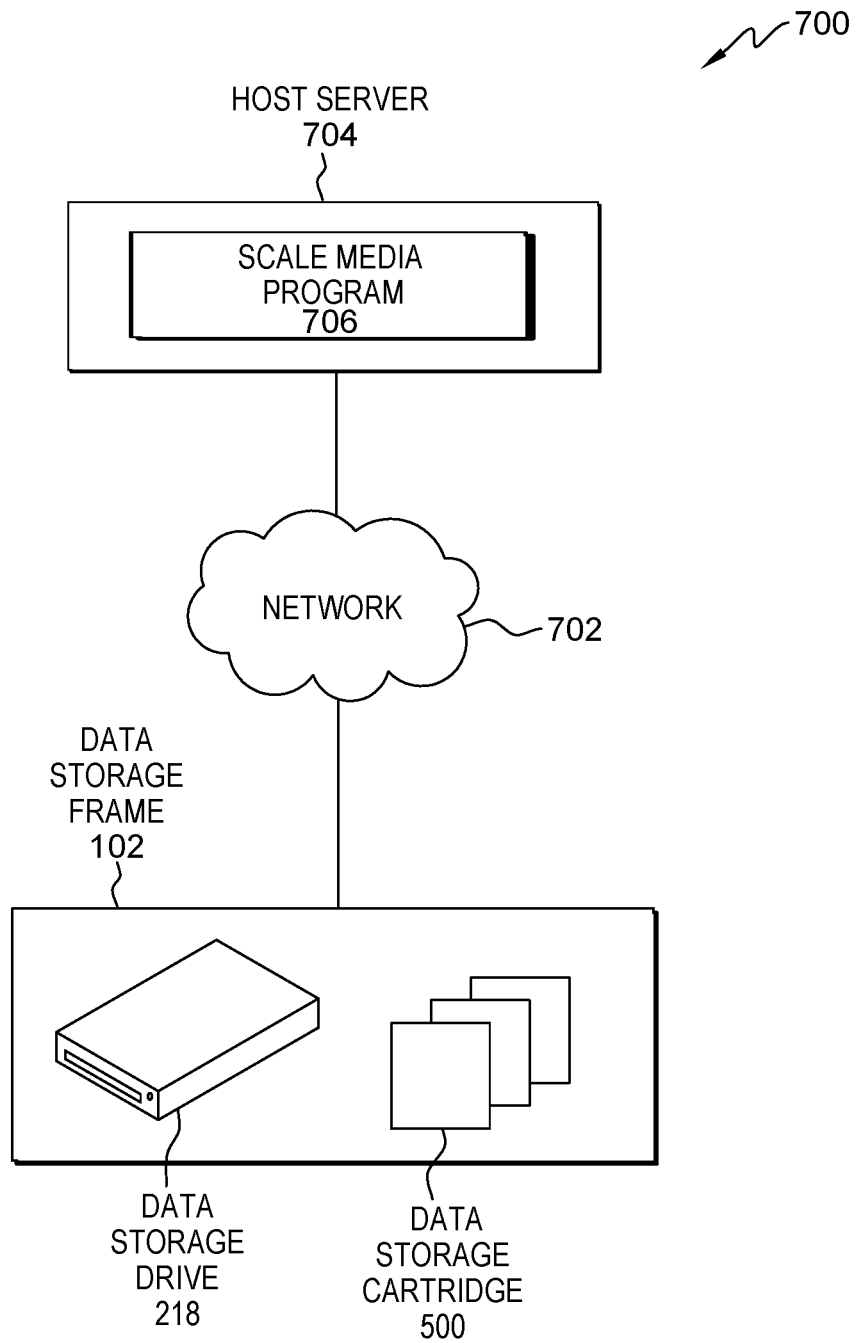
FIG. 7 is a block diagram which illustrates a side perspective view of the data storage library of FIG. 1 including the multi-cartridge deep slot cell of FIGS. 6A and 6B, in accordance with an embodiment of the present invention.

FIG. 7 illustrates a portion of a data storage library management environment, generally designated 700, suitable for providing data storage library management, in accordance with at least one embodiment of the invention. In one embodiment, data storage library storage management environment 700 includes a network, such as network 702, a host server computer, such as host server 704, and a data storage frame, such as data storage frame 102. In one embodiment, a plurality of data storage library frames (not shown), can be interconnected to form one or more data storage libraries, such as data storage library 100. FIG. 7 provides only an illustration of one implementation and does not imply any limitations with regard to the environments in which different embodiments may be implemented. Many modifications to the depicted environment may be made by those skilled in the art without departing from the scope of the invention as recited by the claims.

In one embodiment, network 702 is the Internet representing a worldwide collection of networks and gateways that use TCP/IP protocols to communicate with one another. Network 702 may include wire cables, wireless communication links, fiber optic cables, routers, switches and/or firewalls. In one embodiment, host server 704 and data storage frame 102 are interconnected by network 702. In one embodiment, network 702 can be any combination of connections and protocols capable of supporting scale media commands within a data storage library management environment, such as data storage library management environment 700, between a host, such as host server 704 and a data storage frame, such as data storage frame 102, utilizing a scale media program, such as scale media program 706. In one embodiment, network 702 connects a host, such as host server 704 to a data storage frame, such as data storage frame 102, utilizing any fiber channel protocol, such as small computer system interface (SCSI), internet protocol-based iSCSI over transmission control protocol/internet protocol (TCP/IP) and serial attached SCSI (SAS), capable of supporting SCSI commands.

In another embodiment, network 702 may also be implemented as a number of different types of networks, such as an intranet, a local area network (LAN), a virtual local area network (VLAN), or a wide area network (WAN). FIG. 7 is intended as an example and not as an architectural limitation for the different embodiments that may be implemented by those skilled in the art.

In one embodiment, a host, such as host server 704, may be, for example, a server computer system, such as a database management server, a data storage library management server, database server, a web server, a structured query language server or any other electronic device or computing system capable of sending and receiving data. In one embodiment, host server 704 may be a mainframe virtual tape solution that supports tape media management with scale media commands. In one embodiment, host server 704 may write data to physical tape storage utilizing high performance tape drives installed in a data storage frame, such as data storage frame 102, utilizing SCSI commands. In one embodiment, host server 704 may provide scale media commands to a data storage drive, such as data storage drive 218. In one embodiment, host server 704 may be a database server operating on a legacy system, such as a mainframe system. In another embodiment, host server 704 represents a "cloud" of computers interconnected by one or more networks, such as network 702, where host server 704 is a computing system utilizing clustered computers and components to act as a single pool of seamless resources when accessed through network 702. This is a common implementation for data centers in addition to cloud computing applications. In the one embodiment, host server 704 includes a scale media program, such as scale media program 706.

In an alternative embodiment, the host may be a client computer (not shown) that is a client to a host, such as host server 704, and may be, for example, a server, a desktop computer, a laptop computer, a tablet computer, a personal digital assistant (PDA), a smart phone, a thin client or any other electronic device or computing system capable of communicating with host server 704 through network 702 within a data storage management environment, such as data storage library management environment 700. For example, the client computer may be a laptop computer capable of connecting to a network, such as network 702, to submit one or more scale media commands to a data storage drive, such as data storage drive 218 in a data storage frame, such as data storage frame 102, utilizing a scale media program, such as scale media program 706, via a host, such as host server 704. In another embodiment, the client computer may be any suitable type of client device capable of submitting one or more scale media commands to a host, such as host server 704. In one embodiment, the client computer may include a user interface (not shown) for submitting scale media commands to a data storage management server, such as host server 704, and/or a data storage library, such as data storage library 100. There are many types of user interfaces. In one embodiment, the user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels or text navigation. In computers, GUIs were introduced in reaction to the perceived steep learning curves of command-line interfaces, which required commands to be typed on the keyboard. The actions in GUIs are often performed through direct manipulation of the graphics elements.

In one embodiment, scale media program 706 operates on a central server, such as host server 704, and may be utilized by one or more client computers (not shown) via network 702. In another embodiment, scale media program 706 may be a software-based program downloaded from the central server or a third-party provider (not shown) and executed on a client computer to perform scale media operations on one or more data storage cartridges, such as data storage cartridge 500, utilizing healthy regions of the one or more data storage cartridges. In another embodiment, scale media program 706 may be a software-based program, downloaded from a central server (not shown) and installed on one or more client devices (e.g., a phone, a tablet, a wearable electronic device, etc.) (not shown). In yet another embodiment, scale media program 706 may be utilized as a software service provided by a third-party cloud service provider (not shown). In yet another embodiment, scale media program 706 may include one or more software-based components, such as add-ons, plug-ins, and agent programs, etc., installed on one or more client devices, to perform scale media operations utilizing healthy regions of a data storage cartridge, such as data storage cartridge 500.

In one embodiment, scale media program 706 is a software-based program for executing scale media operations utilizing healthy regions of a data storage cartridge to prevent interference with read/write operations. In one embodiment, scale media program 706 instructs a data storage drive, such as data storage drive 218 to determine a health status index for one or more regions of a data storage cartridge, such as data storage cartridge 500, utilizing one or more parameters. In one embodiment, scale media program 706 instructs the data storage drive, such as data storage drive 218, to record the health status index to a cartridge memory (CM) and a housekeeping dataset (HKDS) of the data storage cartridge, such as data storage cartridge 500. Responsive to receiving a scale media request from a user at the data storage drive, such as data storage drive 218, scale media program 706 instructs the data storage drive to reference the health status index from the CM and the HKDS to determine one or more available regions (i.e., healthy regions) on the data storage cartridge, such as data storage cartridge 500. In one embodiment, scale media program 706 instructs the data storage drive, such as data storage drive 218, to perform one or more measures to exclude any unhealthy regions (e.g., a damaged region, a difficult to use region, etc.) on the data storage cartridge when configuring a reduced capacity, such as data storage cartridge 500, and return the one or more available regions and the reduced capacity for the data storage cartridge to the user.

In one embodiment, data storage frame 102 is a tape library frame interconnected with a host (e.g., a tape library mainframe, a client computer, etc.), such as host server 704. In one embodiment, data storage frame 102 provides the capability to store data through the use of an integrated tape drive, such as data storage drive 218, and one or more magnetic tape cartridges, such as data storage cartridge 500. In one embodiment, data storage frame 102 may represent a plurality of interconnected physical tape libraries. In one embodiment, a plurality of data storage frames (not shown) can be interconnected to form one or more data storage libraries, such as data storage library 100. In one embodiment, one or more tape library frames, such as data storage frame 102, can be organized into a plurality of columns evenly spaced within a floor space (i.e., a designated space within, for example, a physical structure). In another embodiment, one or more tape library frames, such as data storage frame 102, may be stacked atop one or more tape libraries, such as data storage library 100, organized into the plurality of columns to satisfy growth demands of data storage management, within an existing floor space, by effectively building up, as opposed to building out.

In one embodiment, data storage drive 218 is a data storage device for executing read and write operations on one or more tape cartridges, such as data storage cartridge 500. In one embodiment, data storage drive 218 is arranged in a column within a tape library frame of a tape library, such as data storage frame 102 of data storage library 100. In one embodiment, data storage drive 218 and one or more tape cartridges, such as data storage cartridge 500, are stored separately within a tape library, such as data storage library 100, that includes one or more tape library frames, such as data storage frame 102 (i.e., data storage cartridges are stored separately from data storage drives, in one or more tape library frames dedicated for tape media storage). In one embodiment, a tape library, such as data storage frame 102, may include a plurality of data storage drives, such as data storage drive 218, for executing scale media commands on one or more data storage cartridges, such as data storage cartridge 500, where the scale media command modifies cartridge settings of the data storage cartridge to reduce a storage capacity of the data storage cartridge, thereby improving access speed and adjusting the storage capacity for copying tapes between generations. In one embodiment, data storage drive 218 stores data, referred to as tape map, that includes information such as an error rate during reading and writing operations, and a drive status for a mounted data storage cartridge, such as data storage cartridge 500. In one embodiment, the tape map includes values of various items such as a number of re-writes at a time of writing, and a number of error corrections at a time of reading, for each of 128 regions separated in a longitudinal direction between longitudinal position (LP) regions LP3 and LP4 of each wrap on the data storage cartridge. In one embodiment, a data storage drive, such as data storage drive 218, reads and writes data to a data storage cartridge, such as data storage cartridge 500, while reciprocating in a longitudinal direction on a wrap of a medium within the regions separated in the aforementioned manner. In one embodiment, data storage drive 218 reduces capacity of a data storage cartridge, such as data storage cartridge 500, to satisfy a scale media request by shifting a longitudinal position of a read/write head in a longitudinal position region LP4 of the data storage cartridge towards a longitudinal position LP3.

In an alternative embodiment, data storage drive 218 includes one or more integrated programs (not shown), such as scale media program 706, for receiving, from a host, a scale media command to utilize healthy regions of a data storage cartridge to avoid interference with read/write operations. In the alternative embodiment, upon receiving the scale media command, a data storage drive, such as data storage drive 218, determines a health status index for one or more regions of a data storage cartridge. In the alternative embodiment, data storage drive records the health status index to a cartridge memory (CM) and a housekeeping dataset (HKDS) of the data storage cartridge. Responsive to receipt of a scale media request from a user, the data storage drive, such as data storage drive 218, references the health status index from the CM and the HKDS to one or more available regions (i.e., healthy regions) on the data storage cartridge, such as data storage cartridge 500. In the alternative embodiment, the data storage drive, such as data storage drive 218, performs one or more measures to exclude any unhealthy regions (e.g., a damaged region, a difficult to use region, etc.) on the data storage cartridge when configuring a reduced capacity, such as data storage cartridge 500, and returns the one or more available regions and the reduced capacity for the data storage cartridge to the user.

In one embodiment, data storage cartridge 500 is a magnetic tape cartridge capable of storing data within a tape library frame, such as data storage frame 102. In one embodiment, data storage cartridge 500 may be high-density magnetic tape media capable of storing digital information within a tape library frame, such as data storage frame 102. In one embodiment, one or more tape cartridges, such as data storage cartridge 500, may be stored within a high-density storage slot (not shown) within a tape library frame, such as data storage frame 102, where the high-density storage slot is capable of storing up to five tape cartridges stacked in a row within a single slot space within data storage frame 102. In one embodiment, the data storage cartridges of LTO and enterprise data storage drives read and write data along elongated regions (i.e., wraps) separated along a width direction of the data storage cartridge. In one embodiment, each data storage cartridge (i.e., tape medium) is divided into seven regions in a longitudinal direction according to a pre-determined use. In one embodiment, the length of the data storage cartridge is divided into logical points (LPs), which define bounds of various regions of the data storage cartridge, such as data storage cartridge 500. In one embodiment, logical points of the data storage cartridge include the regions of LP0 to LP1 and LP6 and LP7, which are unused as the regions are at the beginning and end of the data storage cartridge, the region of LP1 to LP2, which is a servo acquisition area, the region of LP2 to LP3, which is a calibration area that includes different information in the different bands, the region of LP3 to LP4, which is the user data area, the region of LP4 to LP5, which is an unused user data area, and the region of LP5 to LP6, which is a servo acquisition region for reverse wraps. In one embodiment, the user data section further includes a format identification data set (FID), including information regarding the format of the tape and the tape drive that wrote the FID. In the LTO format, data is written in a serpentine fashion between the logical points each of the data sections between LP3 and LP4. In one embodiment, both ends of a data storage cartridge, and at a boundary of each region, are numbered based on a logical points, ranging from LP0 to LP7. In one embodiment, user data can be saved on the data storage cartridge in a region between LP3 and LP4.

Figure 8:
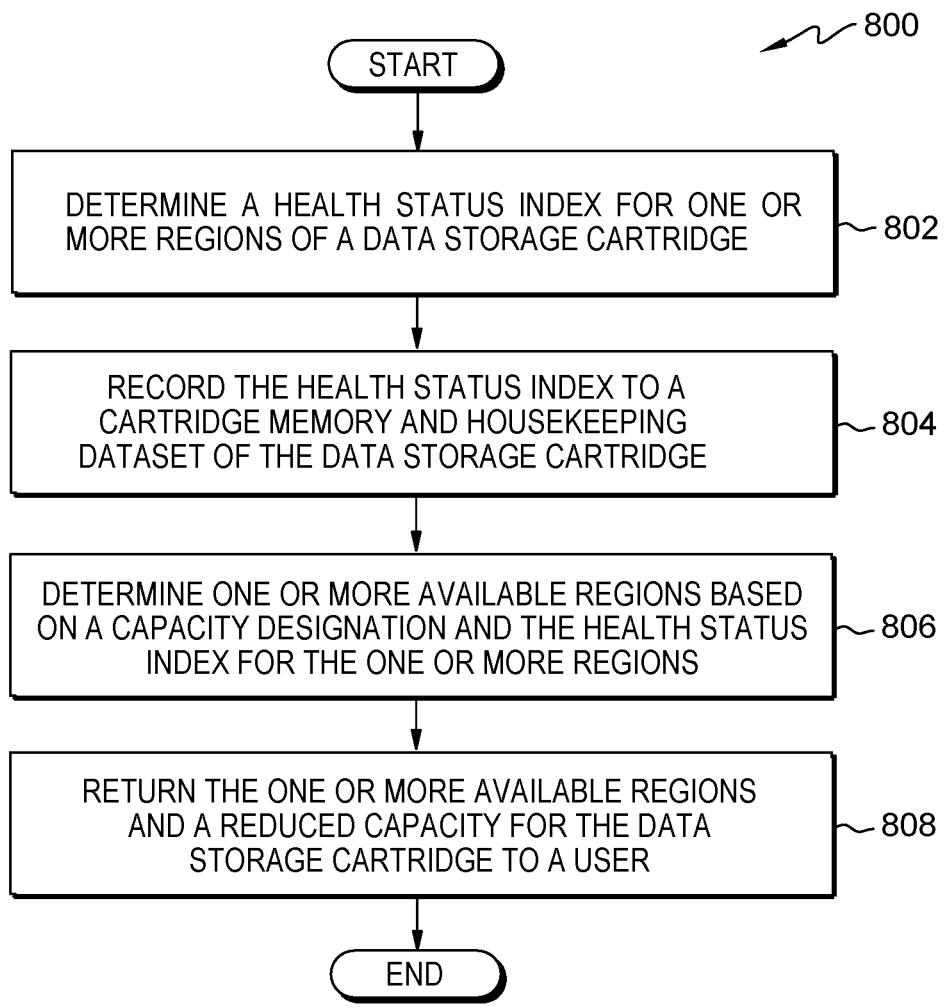
FIG. 8 illustrates a flowchart depicting steps of a scale media program for scaling media utilizing healthy regions of a data storage cartridge, in accordance with an embodiment of the present invention.

FIG. 8 illustrates a flowchart, generally designated 800, depicting steps of a scale media program, such as scale media program 706, for scaling media utilizing healthy regions of a data storage cartridge, such as data storage cartridge 500, in accordance with an embodiment of the present invention. In one embodiment, the method for scaling media utilizing healthy regions of a data storage cartridge, such as data storage cartridge 500, includes determining a health status index for one or more regions of a data storage cartridge (802), recording the health status index to a cartridge memory and a housekeeping dataset of the data storage cartridge (804), responsive to receipt of a scale media request, determining one or more available regions based on a capacity designation and the health status index for the one or more regions (806), and returning the one or more available regions and a reduced capacity for the data storage cartridge to a user (808). It should be understood that although FIG. 8 depicts steps of a scale media program, such as scale media program 706, for scaling media utilizing healthy regions of a data storage cartridge, the depicted steps may be performed by a data storage drive, such as data storage drive 218 independently, performed by a data storage drive, such as data storage drive 218 in response to instructions issued from a scale media program, such as scale media program 706, or performed by a data storage drive, such as data storage drive 218 in combination with a scale media program, such as scale media program 706, and that FIG. 8 should not be construed as limiting performance of the depicted steps to solely the scale media program.

Scale media program 706 determines a health status index for one or more regions of a data storage cartridge (802). In one embodiment, scale media program 706 determines a health status index for one or more regions of a data storage cartridge by calculating an error rate (e.g., a number of error corrections, flaws in read/write operations, etc.) of reading and writing to a tape map on the data storage drive, such as data storage drive 218. In one embodiment, scale media program 706 calculates the error rate by extracting one or more parameters from memory of the data storage drive, such as data storage drive 218, indicating error corrections stored to the tape map, such as when read/write corrections, when the data storage drive reads and writes data to the data storage cartridge. In one embodiment, the tape map stores health status indices of all regions between logical points LP3 and LP4, however it is also possible that a cartridge memory (CM) stores values of only a few regions near both ends of the data storage cartridge, such as data storage cartridge 500. In one embodiment, a number of regions of a data storage cartridge to be evaluated for calculating an error rate may be fixed or made variable depending on statistical information. In one embodiment, scale media program 706 may determine a variable number of regions of the data storage cartridge to calculate the error rate, where the variable number of regions may be controlled on a mode page for controlling one or more data storage drive parameters, or modified using a scale media command, which will be described in further detail below. In one embodiment, since select regions of a data storage cartridge that may have been previously evaluated to be in poor health or difficult to use will not spontaneously become healthy afterward, scale media program 706 may stop extracting one or more detailed parameters for the previously evaluated regions, and instead mark the previously evaluated regions with a flag that indicates that these are unhealthy and difficult to use regions. In one embodiment, although the tape map holds the health status index for each wrap region in a data storage cartridge, such as data storage cartridge 500, where the information for each wrap is not required to determine a healthy region on the data storage cartridge, for example in shifting logical points LP3/LP4 described in further detail below, scale media program 706 may calculate error rate values by overlapping values of a plurality of wraps in a region of the data storage cartridge, such as all wraps or for wraps in each data band for the data storage cartridge. For example, tape wear is caused when the magnetic head of the drive rubs the surface of tape media. A width of a magnetic read/write head of a data storage drive, such as data storage drive 218, is longer than a width of the magnetic tape band, and all wraps are in contact with the head no matter which wrap the data storage drive is reading or writing data on. In other words, even if a read/write head of a data storage drive reads and writes only a specific wrap, all wraps will be damaged to some degree. Additionally, since a physical location of each region is common among all wraps, even to prevent the error rate from increasing due to scratches or dust on a specific wrap, a target region must be excluded from all wraps. Where wraps subject to read/write errors concentrate in certain regions of the data band for the data storage cartridge that are not necessarily recognized, overlapped information of all wraps is adequate in most cases to address the damaged regions of the data storage cartridge.

Scale media program 706 records the health status index to a cartridge memory and a housekeeping dataset in the data storage cartridge (804). In one embodiment, scale media program 706 records the health status index to a cartridge memory (CM) and a housekeeping dataset (HKDS) in the data storage cartridge by saving error rate values of a plurality of wraps in a region of the data storage cartridge to the CM and HKDS. In one embodiment, scale media program 706 stores the one or more error rate values that reflect error corrections for a sample of the one or more regions near both ends of the data storage cartridge to reduce an amount of data saved to the cartridge memory. For example, the CM may have a capacity as small as 16 KB (32 KB for the latest generation TS1160 tape drive JE cartridge for enterprise type data storage drives) and therefore cannot store all the tape map information for a data storage cartridge, such as data storage cartridge 500. Scale media program 706 addresses the reduced capacity of the CM utilizing measures outlined above in step 802 to reduce the amount of data being saved in the CM. In one embodiment, scale media program 706 saves the tape map values itself to the CM. In one embodiment, scale media program 706 may quantify error rate values using the values in the tape map and then save the quantified error rate values in the CM. For example, to avoid use of regions at both ends of the data storage cartridge, which are typically heavily worn, it is not always necessary to retain error rate values of regions other than those regions near both ends of the data storage cartridge when shifting the positions of logical points LP3/LP4 to isolate healthy regions (i.e., available healthy regions) of the data storage cartridge, as discussed in further detail below.

Scale media program 706 determines one or more available regions based on a capacity designation and the health status index for the one or more regions (806). In one embodiment, responsive to receipt of a scale media command from a user, scale media program 706 determines one or more available regions based on a capacity designation and the health status index for the one or more regions by referencing the health status index saved in a cartridge memory of the data storage cartridge as discussed above. In one embodiment, the scale media request includes the capacity designation selected by a user, where the capacity designation is a desired reduced capacity for the data storage cartridge. In one embodiment, scale media program 706 determines one or more healthy regions that effectively exclude any damaged regions on the data storage cartridge that may interfere with reading and writing operations. In one embodiment, scale media program 706 determines one or more available (i.e., healthy) regions utilizing at least one of several mechanisms to exclude damaged regions on the data storage cartridge and select one or more healthy regions that remain.

In one embodiment, scale media program 706 determines one or more available regions (i.e., healthy regions) on the data storage cartridge by shifting logical points LP3 and LP4 inward towards one another. In one embodiment, scale media program 706 evaluates the health status index for one or more regions around logical points LP3 and LP4, and where health status index for the one or more regions around logical points LP3 and LP4 indicate healthy regions, scale media program 706 shifts logical point LP3 inward towards logical point LP4, shifts logical point LP4 inward towards logical point LP3, or simultaneously shifts both logical points LP3 and LP4 inward towards one another, to exclude any damaged or difficult to use regions at both ends of the tape media (i.e., the magnetic tape fabric) that are particularly prone to damage outside of a newly configured available region between the shifted boundaries of logical points LP3 and LP4. For example, shifting the boundaries of logical points LP3 and LP4 inward towards one another and away from the outer ends of the tape media has the advantage that the storage capacity usage of the CM can be reduced since only data on overlapped health status indices of all wraps in the region around the shifted boundaries of logical points LP3 and LP4 is saved.

In one embodiment, scale media program 706 determines one or more available regions (i.e., healthy regions) on the data storage cartridge by setting a wrap to turn around in a middle area of the tape media of the data storage cartridge to avoid damaged regions. In one embodiment, where scale media program 706 determines a difficult to use region is in the middle of the tape media, scale media program 706 saves positions of both ends of that region in the CM, and sets a wrap so that the read/write head of the data storage drive first reciprocates from logical point LP3 to a front of the difficult to use region, and after writing all the wraps, reciprocates from behind the region to be used to logical point LP4. For example, setting a wrap to turn around in a middle area of the tape media of a data storage cartridge provides a mechanism to avoid unhealthy regions in the middle of the tape media. In one embodiment, scale media program 706 may adopt a logical point LP3/LP4 shifting mechanism as described above simultaneously with setting a wrap to turn around in a middle area of the tape media.

In one embodiment, scale media program 706 determines one or more available regions (i.e., healthy regions) on the data storage cartridge by selecting a damaged region to be skipped over during read and write operations. In one embodiment, scale media program 706 determines a damaged region based on error rate values, and saves a location of the damaged region to the CM. In one embodiment, scale media program 706 sets read and write operations to exclude the location of the damaged region, such that as a read/write head of the data storage drive reads or writes to the tape media, the read/write head will pause operations over the damaged region, effectively skipping over (e.g., jumping) the damaged location and confining the read/write operations to healthy regions of the tape media.

In one embodiment, for any of the measures taken above as examples, where a tape capacity obtained by excluding all unhealthy, damaged, or difficult to use regions is less than a capacity designated by a scale media request, regions with severe damage (e.g., high error rate values) are prioritized to be avoided first. In one embodiment, where there are no damaged regions, a reduced capacity is changed by shifting a position of logical point LP4 toward logical point LP3 as in the above referenced measures. In one embodiment, assuming that a vicinity of logical points LP3 and LP4 will be worn in the future, a measure to actively shift both logical points LP3 and LP4, or only logical point LP3 may be similarly adopted.

Scale media program 706 returns the one or more available regions and a reduced capacity for the data storage cartridge to a user (808). In one embodiment, scale media program 706 presents an option to reduce capacity of the data storage cartridge to avoid damaged regions on the tape media. For example, when a scale media request is issued with this option, scale media program 706 sets a new capacity utilizing any of the measures discussed to avoid difficult to use regions that were evaluated to be damaged based on the error rate values stored in the CM. In one embodiment, scale media program 706 returns a new capacity supported by the one or more available regions. In one embodiment, scale media program 706 may adopt a two-step design where a reduced capacity presented to a user before an actual capacity of the data storage cartridge is changed. In one embodiment, scale media program 706 may perform a capacity change responsive to receipt of a user confirmation to adopt the reduced capacity in order to avoid damaged regions on the tape media. In one embodiment, scale media program 706 returns the one or more available regions to a user to be selected as a user region for read/write operations, and provides a reduced capacity for the one or more available regions that ensures healthy regions of the tape media of the data storage cartridge are being utilized for reading and writing data.

Figure 9:
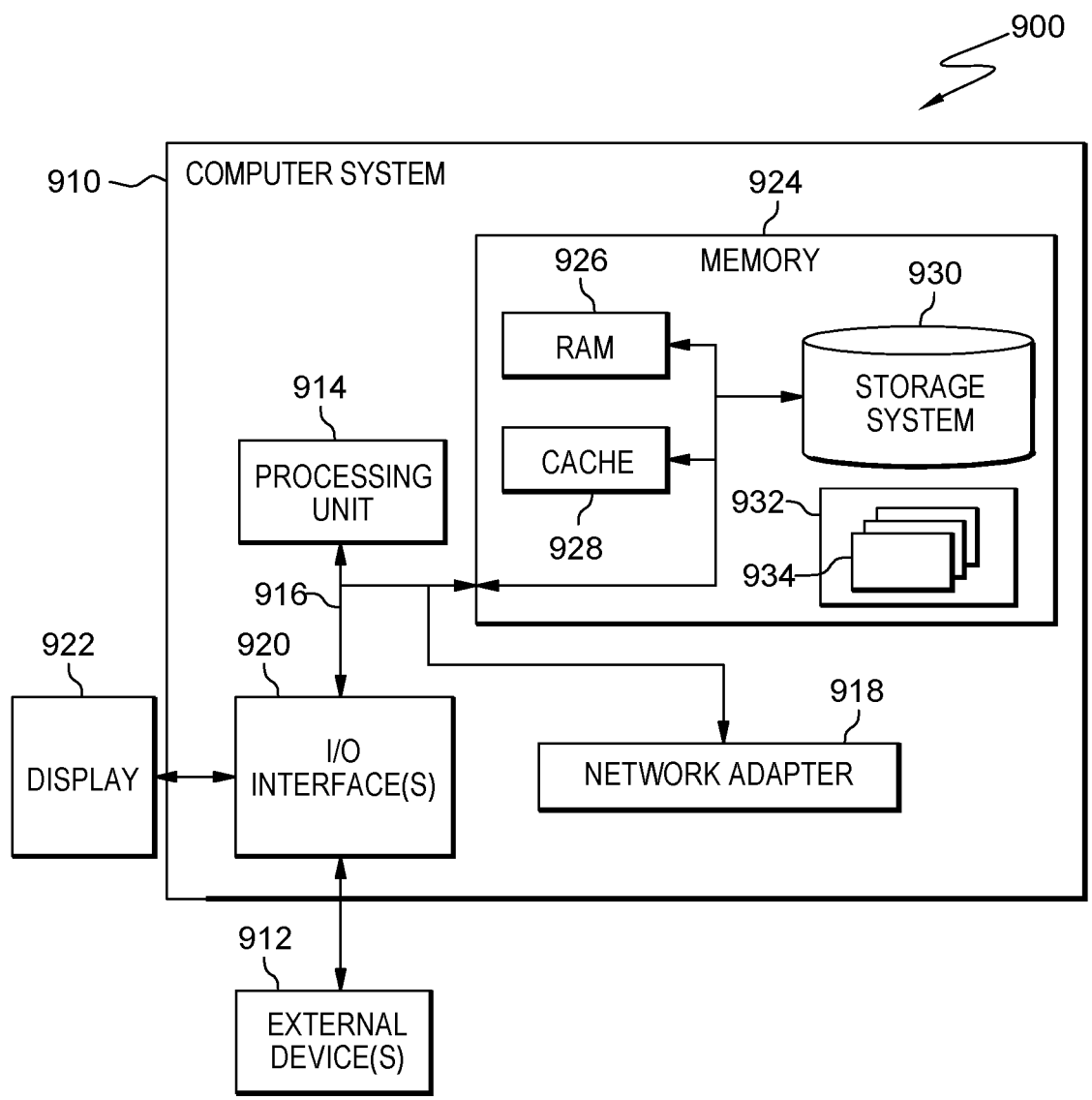
FIG. 9 illustrates a block diagram depicting components of a data processing system, in accordance with an embodiment of the present invention.

FIG. 9 is a block diagram, generally designated 900, depicting components of computing system, such as a server computer (e.g., host computer) interconnected with data storage frame 102 of FIG. 7, generally designated 900, in accordance with an embodiment of the present invention. It should be appreciated that FIG. 9 provides only an illustration of one implementation and does not imply any limitations with regard to the environments in that different embodiments may be implemented. Many modifications to the depicted environment may be made.

In the illustrative embodiment, the host computer is shown in the form of a general-purpose computing device, such as computer system 910. The components of computer system 910 may include, but are not limited to, one or more processors or processing unit(s) 914, memory 924 and bus 916 that couples various system components including memory 924 to processing unit(s) 914.

Bus 916 represents one or more of any of several types of bus structures, including a memory bus or memory controller, a peripheral bus, an accelerated graphics port and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus and Peripheral Component Interconnect (PCI) bus.

Computer system 910 typically includes a variety of computer system readable media. Such media may be any available media that is accessible by computer system 910 and it includes both volatile and non-volatile media, removable and non-removable media.

Memory 924 can include computer system readable media in the form of volatile memory, such as random-access memory (RAM) 926 and/or cache memory 928. Computer system 910 may further include other removable/non-removable, volatile/non-volatile computer system storage media. By way of example only, storage system 930 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk") and an optical disk drive for reading from or writing to a removable, non-volatile optical disk, such as a CD-ROM, DVD-ROM or other optical media can be provided. In such instances, each can be connected to bus 916 by one or more data media interfaces. As will be further depicted and described below, memory 924 may include at least one computer program product having a set (e.g., at least one) of program modules that are configured to carry out the functions of embodiments of the invention.

Program/utility 932, having one or more sets of program modules 934, may be stored in memory 924 by way of example and not limitation, as well as an operating system, one or more application programs, other program modules and program data. Each of the operating systems, one or more application programs, other program modules and program data or some combination thereof, may include an implementation of a networking environment. Program modules 934 generally carry out the functions and/or methodologies of embodiments of the invention as described herein. Computer system 910 may also communicate with one or more external device(s) 912, such as a keyboard, a pointing device, a display 922, etc. or one or more devices that enable a user to interact with computer system 910 and any devices (e.g., network card, modem, etc.) that enable computer system 910 to communicate with one or more other computing devices. Such communication can occur via Input/Output (I/O) interface(s) 920. Still yet, computer system 910 can communicate with one or more networks, such as a local area network (LAN), a general wide area network (WAN) and/or a public network (e.g., the Internet) via network adapter 918. As depicted, network adapter 918 communicates with the other components of computer system 910 via bus 916. It should be understood that although not shown, other hardware and software components, such as microcode, device drivers, redundant processing units, external disk drive arrays, RAID systems, tape drives and data archival storage systems may be used in conjunction with computer system 910.

The present invention may be a system, a method and/or a computer program product. The computer program product may include a computer readable storage medium (or media) having computer readable program instructions thereon for causing a processor to carry out aspects of the present invention. In one embodiment, the computer readable storage medium having computer readable program instructions thereon may be internal to a server computer. In another embodiment, the computer readable storage medium having computer readable program instructions thereon may be internal to a server computer. In other embodiments, the computer readable storage medium having computer readable program instructions thereon may be stored external to a server computer, such that a client computer communicates with the server computer through a network connection to execute the computer readable program instructions on data storage library 100.

In another embodiment, the computer readable storage medium having computer readable program instructions thereon may be internal to data storage library 100. In other embodiments, the computer readable storage medium having computer readable program instructions thereon may be stored external to data storage library 100, such that a server computer communicates with data storage library 100 through a network connection to execute the computer readable program instructions on data storage library 100.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the invention. It will be understood that each block of the flowchart illustrations and/or block diagrams and combinations of blocks in the flowchart illustrations and/or block diagrams, can be implemented by computer readable program instructions.

These computer readable program instructions may be provided to a processor of a general purpose computer, a special purpose computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus or other device to cause a series of operational steps to be performed on the computer, other programmable apparatus or other device to produce a computer implemented process, such that the instructions which execute on the computer, other programmable apparatus or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace or to enable others of ordinary skill in the art to understand the embodiments disclosed herein.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a", "an", and "the" are intended to include the plural forms as well, unless the context clearly indicates otherwise.

What is claimed is:

1. A method for scaling media utilizing healthy regions of a data storage cartridge, the method comprising:
   determining, by one or more computer processors, a health status index for one or more regions of a data storage cartridge;
   recording, by the one or more computer processors, the health status index to a cartridge memory and to a housekeeping dataset of the data storage cartridge;
   determining, by the one or more computer processors, one or more available regions of the data storage cartridge, based, at least in part, on a capacity designation and the health status index for the one or more regions; and
   returning, by the one or more computer processors, the one or more available regions and a reduced capacity for the data storage cartridge to a user.

2. The method of claim 1, wherein determining the health status index for one or more regions of the data storage cartridge further comprises:
   calculating, by one the one or more computer processors, an error rate of reading and writing to a tape map, wherein calculating the error rate includes extracting one or more parameters from memory of the data storage drive.

3. The method of claim 2, wherein the one or more parameters indicate read/write corrections stored to the tape map when the data storage drive reads and writes data to the data storage cartridge.

4. The method of claim 1, wherein determining the health status index for one or more regions of the data storage cartridge further comprises:
   determining, by the one or more computer processors, a variable number of the one or more regions of the data storage cartridge to calculate an error rate, where the variable number of the one or more regions is controlled on a mode page for controlling one or more data storage drive parameters.

5. The method of claim 1, wherein recording the health status index to the cartridge memory and to the housekeeping dataset of the data storage cartridge further comprises:
   saving, by the one or more computer processors, one or more error rate values of a plurality of wraps in the one or more regions of the data storage cartridge to the cartridge memory and to the housekeeping dataset, wherein the one or more error rate values reflect error corrections for a sample of the one or more regions near each end of the data storage cartridge to reduce an amount of data saved to the cartridge memory.

6. The method of claim 1, wherein determining the one or more available regions based on the capacity designation and the health status index for the one or more regions further comprises:
   based, at least in part, on receipt of a scale media command from the user, referencing, by the one or more computer processors, the health status index saved in the cartridge memory of the data storage cartridge, wherein the scale media command includes the capacity designation selected by the user, and wherein the capacity designation is a desired reduced capacity for the data storage cartridge; and
   determining, by the one or more computer processors, one or more healthy regions that exclude one or more damaged regions on the data storage cartridge that interfere with reading and writing operations.

7. The method of claim 6, wherein determining the one or more healthy regions that exclude the one or more damaged regions on the data storage cartridge further comprises:
   determining, by the one or more computer processors, the one or more healthy regions on the data storage cartridge by shifting logical points defining a user data area of the data storage cartridge inward towards one another;

determining, by the one or more computer processors, the one or more healthy regions on the data storage cartridge by setting a wrap to turn around in a middle area of media of the data storage cartridge to avoid damaged regions; and determining, by the one or more computer processors, the one or more healthy regions on the data storage cartridge by selecting a damaged region on the media of the data storage cartridge to be skipped over during read and write operations.

8. A computer program product for scaling media utilizing healthy regions of a data storage cartridge, the computer program product comprising:

one or more computer readable storage media and program instructions stored on the one or more computer readable storage media, the stored program instructions comprising:

program instructions to determine a health status index for one or more regions of a data storage cartridge;

program instructions to record the health status index to a cartridge memory and housekeeping dataset of the data storage cartridge;

program instructions to determine one or more available regions of the data storage cartridge, based, at least in part, on a capacity designation and the health status index for the one or more regions; and program instructions to return the one or more available regions and a reduced capacity for the data storage cartridge to a user.

9. The computer program product of claim 8, wherein the stored program instructions to determine the health status index for one or more regions of the data storage cartridge further comprise:

program instructions to calculate an error rate of reading and writing to a tape map, wherein calculating the error rate includes extracting one or more parameters from memory of the data storage drive.

10. The computer program product of claim 9, wherein the one or more parameters indicate read/write corrections stored to the tape map when the data storage drive reads and writes data to the data storage cartridge.

11. The computer program product of claim 8, wherein the stored program instructions to determine the health status index for one or more regions of the data storage cartridge further comprise:

program instructions to determine a variable number of the one or more regions of the data storage cartridge to calculate an error rate, where the variable number of the one or more regions is controlled on a mode page for controlling one or more data storage drive parameters.

12. The computer program product of claim 8, wherein the stored program instructions to record the health status index to the cartridge memory and housekeeping dataset of the data storage cartridge further comprise:

program instructions to save one or more error rate values of a plurality of wraps in the one or more regions of the data storage cartridge to the cartridge memory and housekeeping dataset, wherein the one or more error rate values reflect error corrections for a sample of the one or more regions near each end of the data storage cartridge to reduce an amount of data saved to the cartridge memory.

13. The computer program product of claim 8, wherein the stored program instructions to determine the one or more available regions based on the capacity designation and the health status index for the one or more regions further comprise:

program instructions to, responsive to receipt of a scale media command from a user, reference the health status index saved in the cartridge memory of the data storage cartridge, wherein the scale media command includes the capacity designation selected by the user, and wherein the capacity designation is a desired reduced capacity for the data storage cartridge; and program instructions to determine one or more healthy regions that exclude one or more damaged regions on the data storage cartridge that interfere with reading and writing operations.

14. The computer program product of claim 13, wherein the stored program instructions to determine the one or more healthy regions that exclude the one or more damaged regions on the data storage cartridge further comprises:

program instructions to determine the one or more healthy regions on the data storage cartridge by shifting logical points defining a user data area of the data storage cartridge inward towards one another;

program instructions to determine the one or more healthy regions on the data storage cartridge by setting a wrap to turn around in a middle area of media of the data storage cartridge to avoid damaged regions; and program instructions to determine the one or more healthy regions on the data storage cartridge by selecting a damaged region on the media of the data storage cartridge to be skipped over during read and write operations.

15. A computer system for scaling media utilizing healthy regions of a data storage cartridge, the computer system comprising:

one or more computer processors;

one or more computer readable storage media; and program instructions stored on at least one of the one or more computer readable storage media for execution by at least one of the one or more computer processors, the stored program instructions comprising:

program instructions to determine a health status index for one or more regions of a data storage cartridge;

program instructions to record the health status index to a cartridge memory and housekeeping dataset of the data storage cartridge;

program instructions to determine one or more available regions of the data storage cartridge, based, at least in part, on a capacity designation and the health status index for the one or more regions; and program instructions to return the one or more available regions and a reduced capacity for the data storage cartridge to a user.

16. The computer system of claim 15, wherein the stored program instructions to determine the health status index for one or more regions of the data storage cartridge further comprise:

program instructions to calculate an error rate of reading and writing to a tape map, wherein calculating the error rate includes extracting one or more parameters from memory of the data storage drive.

17. The computer system of claim 15, wherein the stored program instructions to determine the health status index for one or more regions of the data storage cartridge further comprise:

program instructions to determine a variable number of the one or more regions of the data storage cartridge to calculate an error rate, where the variable number of the one or more regions is controlled on a mode page for controlling one or more data storage drive parameters.

18. The computer system of claim 15, wherein the stored program instructions to record the health status index to the cartridge memory and housekeeping dataset of the data storage cartridge further comprise:

program instructions to save one or more error rate values of a plurality of wraps in the one or more regions of the data storage cartridge to the cartridge memory and housekeeping dataset, wherein the one or more error rate values reflect error corrections for a sample of the one or more regions near each end of the data storage cartridge to reduce an amount of data saved to the cartridge memory.

19. The computer system of claim 15, wherein the stored program instructions to determine the one or more available regions based on the capacity designation and the health status index for the one or more regions further comprise:

program instructions to, responsive to receipt of a scale media command from a user, reference the health status index saved in the cartridge memory of the data storage cartridge, wherein the scale media command includes the capacity designation selected by the user, and wherein the capacity designation is a desired reduced capacity for the data storage cartridge; and program instructions to determine one or more healthy regions that exclude one or more damaged regions on the data storage cartridge that interfere with reading and writing operations.

20. The computer system of claim 19, wherein the stored program instructions to determine the one or more healthy regions that exclude the one or more damaged regions on the data storage cartridge further comprises:

program instructions to determine the one or more healthy regions on the data storage cartridge by shifting logical points defining a user data area of the data storage cartridge inward towards one another;

program instructions to determine the one or more healthy regions on the data storage cartridge by setting a wrap to turn around in a middle area of media of the data storage cartridge to avoid damaged regions; and program instructions to determine the one or more healthy regions on the data storage cartridge by selecting a damaged region on the media of the data storage cartridge to be skipped over during read and write operations.

\* \* \* \* \*